United States Patent
James

(10) Patent No.: US 7,513,995 B2
(45) Date of Patent: Apr. 7, 2009

(54) AIR DRIVEN PARTICLE RECIRCULATOR FOR A SEPTIC TANK OUTLET BAFFLE OR FILTER ASSEMBLY

(76) Inventor: Jesse Alan James, 7777 E. 900th Ave., Newton, IL (US) 62448

( * ) Notice: Subject to any disclaimer, the term of this patent is extended or adjusted under 35 U.S.C. 154(b) by 0 days.

(21) Appl. No.: 11/881,723

(22) Filed: Jul. 27, 2007

(65) Prior Publication Data

US 2009/0026121 A1    Jan. 29, 2009

(51) Int. Cl.
*C02F 3/02* (2006.01)
(52) U.S. Cl. .................... 210/220; 210/532.2; 261/123; 261/124
(58) Field of Classification Search ............ 210/170.08, 210/220, 532.1, 532.2; 261/123, 124
See application file for complete search history.

(56) References Cited

U.S. PATENT DOCUMENTS

| | | | |
|---|---|---|---|
| 3,043,433 A * | 7/1962 | Singer .................... 261/123 |
| 3,627,135 A | 12/1971 | Goodman |
| 3,680,704 A * | 8/1972 | Schaefer ................ 210/170.08 |
| 3,744,637 A | 7/1973 | Ziegler |
| 3,819,054 A | 6/1974 | Long et al. |
| 3,883,427 A | 5/1975 | Oldham et al. |
| 3,923,657 A * | 12/1975 | Roser .................... 210/170.08 |
| 4,070,292 A * | 1/1978 | Adams ........................ 210/220 |
| 4,482,509 A * | 11/1984 | Iannelli ...................... 261/124 |
| 4,690,756 A * | 9/1987 | Van Ry ...................... 261/123 |
| 5,217,609 A * | 6/1993 | Holdeman ................. 210/220 |
| 5,308,479 A | 5/1994 | Iwai et al. |
| 5,609,754 A * | 3/1997 | Stuth ........................ 210/532.2 |
| 5,620,602 A * | 4/1997 | Stuth ........................ 210/532.2 |
| 5,690,824 A * | 11/1997 | Stuth ........................ 210/532.2 |
| 5,785,854 A | 7/1998 | McKinney |
| 6,099,722 A | 8/2000 | Tittlebaum et al. |
| 6,554,996 B1 | 4/2003 | Rebori |
| 6,576,130 B2 * | 6/2003 | Wallace ................... 210/532.1 |
| RE39,203 E | 7/2006 | McKinney |
| 2002/0070162 A1 | 6/2002 | Fife et al. |
| 2004/0206701 A1 | 10/2004 | Fife et al. |
| 2006/0226071 A1 * | 10/2006 | Allen et al. ............... 210/532.2 |
| 2007/0007202 A1 | 1/2007 | Stuth, Sr. et al. |

* cited by examiner

*Primary Examiner*—Christopher Upton
(74) *Attorney, Agent, or Firm*—John F. Watson; R. Sean Hocking; Craig & Craig

(57) ABSTRACT

An air driven particle recirculator designed to introduce air around a single or multiple compartment septic tank discharge outlet baffle or filter assembly. The air driven particle recirculator causes a movement of waste particles and suspended solids to be forced away from the inlet of the outlet baffle or filter assembly to only allow cleaner filtered effluent to enter the secondary treatment system. The particle recirculator performs a function normally carried out by a settling compartment or clarifier zone associated in aerobic type septic systems. When installed in a single or multiple compartment septic tank utilizing an aerobic process, the particle recirculator will remove waste particles from the discharge area causing cleaner discharge and a cleaner septic tank filter assembly or outlet baffle reducing potential pre-mature failure or damage to the secondary treatment system. The particle recirculator, used in conjunction with an aerobic process, will result in dramatically and lower coliform and *E. coli* bacteria levels, as well as reduce levels of oil, grease, settable solids and suspended residue.

6 Claims, 6 Drawing Sheets

TYPICAL INSTALLATION IN EXISTING SEPTIC TANK

AIR DRIVEN PARTICLE RECIRCULATOR FOR A SEPTIC TANK OUTLET BAFFLE OR FILTER ASSEMBLY

BACKGROUND OF THE INVENTION

The most common type of septic system used in the United States consists of a septic tank and some form of secondary treatment system, usually a subsurface seepage system also known as a field absorption system. The septic tanks used in this type of septic system use anaerobic bacteria to break down waste, a process which causes large particles of waste and sludge to remain within the septic tank or secondary treatment system. Such a system is called an anaerobic system. Another method by which septic systems break down waste introduces forced air into the septic tank through a diffuser system which causes aerobic bacteria to proliferate in the septic tank and septic system. Such a system is called an aerobic system. In either type of system, anaerobic or aerobic, the processed liquid waste, also called effluent, exits the septic tank through an outlet baffle or a filter assembly and enters into the secondary treatment system where the treatment process continues. An outlet baffle is a mechanism designed to simultaneously enable the discharge of effluent from the septic tank, while limiting the discharge of large particles of waste and sludge from the septic tank. A filter assembly is an outlet baffle that incorporates some type of filter to further restrict the discharge of large particles of waste and sludge. Both outlet baffles and filters exist in a variety of different diameters to meet the particular specifications of various septic systems. A filter can be removed from the filter assembly and cleaned or replaced as needed.

Some aerobic systems employ a clarifier zone or a settling compartment for the purpose of allowing waste particles to settle away from the inlet of the outlet baffle or filter assembly after the waste particles have been broken down by both aerobic action and movement caused by the introduction of air into the septic tank. Single compartment septic tanks that have been converted to use the aerobic process do not have a clarifier zone or settling compartment, and therefore, those moving waste particles can be forced to enter into the inlet of the outlet baffle or the filter assembly by introducing air into the system with an air pump.

Effluent, the processed fluid which exits the septic tank through the outlet baffle or filter assembly, can contain waste particles having a high level of coliform or E. coli bacteria. Further, the filter inside the filter assembly can become clogged because of the forced air movement of waste particles associated with the aerobic process, resulting in a back-up of sewage inside the residence or building being served by the septic system. The claimed invention improves upon the outlet baffles and filter assemblies in the prior art by introducing forced air from an air pump directly at the inlet of the outlet baffle or filter assembly. The introduction of forced air at the inlet of the outlet baffle or filter assembly greatly restricts the ability of waste particles to enter the-outlet baffle or filter assembly. The introduction of air simultaneously forces those waste particles away from the outlet baffle or filter assembly. The claimed invention utilizes this process to increase the productivity of the septic system by reducing the number of waste particles entering the outlet baffle or filter assembly. This process results in a reduction in the discharge of coliform and E. coli bacteria as well as oil, grease, settable solids and suspended solids, thereby reducing the frequency with which the filter must be cleaned or replaced.

The low pressure area produced by introducing air around and near the inlet of the outlet baffle or filter assembly redirects any waste particles away from the discharge point where the particles are recirculated by the aerobic action process until such waste particles are broken down into very small particles eliminating the need for a clarifier compartment or a settling compartment used in conventional aerobic systems.

The particle recirculator can be added to existing septic tanks and septic systems by attaching the particle recirculator to the existing outlet baffle or filter assembly at two connection points, or by a single vertically elongated connection point. If the existing septic system already has an air pump for aerobic action, then the particle recirculator can utilize this existing air pump to deliver air to the inlet of the outlet baffle or filter assembly.

The particle recirculator can also be incorporated into a new septic system and the outlet baffle or filter assembly that would accompany a new system. Accordingly, the particle recirculator can by manufactured in conjunction with the outlet baffle or filter assembly to create a unified piece. A unified piece can be created by injection molding or other molding techniques.

BRIEF SUMMARY OF THE INVENTION

An air driven particle recirculator designed to introduce air around a single or multiple compartment septic tank outlet baffle or filter assembly. This air driven particle recirculator will cause a movement of waste particles and suspended solids to be forced away from the outlet baffle or filter assembly and allow only cleaner effluent to enter the secondary treatment system. This device will perform the function normally carried out by a settling compartment or clarifier compartment associated with aerobic type septic systems by forcing the solids and waste particles away from the septic tank outlet baffle or filter assembly. When installed in single compartment septic tanks utilizing the aerobic process the particle recirculator will remove waste particles from the discharge area causing cleaner discharges free of waste particles that could clog the septic tank filter assembly or outlet baffle and reduce potential damage to the secondary treatment system. An additional benefit of the particle recirculator is the introduction of oxygen directly at the septic tank filter assembly or outlet baffle causing large amounts of oxygen with aerobic bacteria to flow out of the septic tank and into the secondary treatment system, which could prolong the life of the secondary treatment system.

BRIEF DESCRIPTION OF ANY DRAWINGS

DETAILED DESCRIPTION OF THE INVENTION

Figure 1:
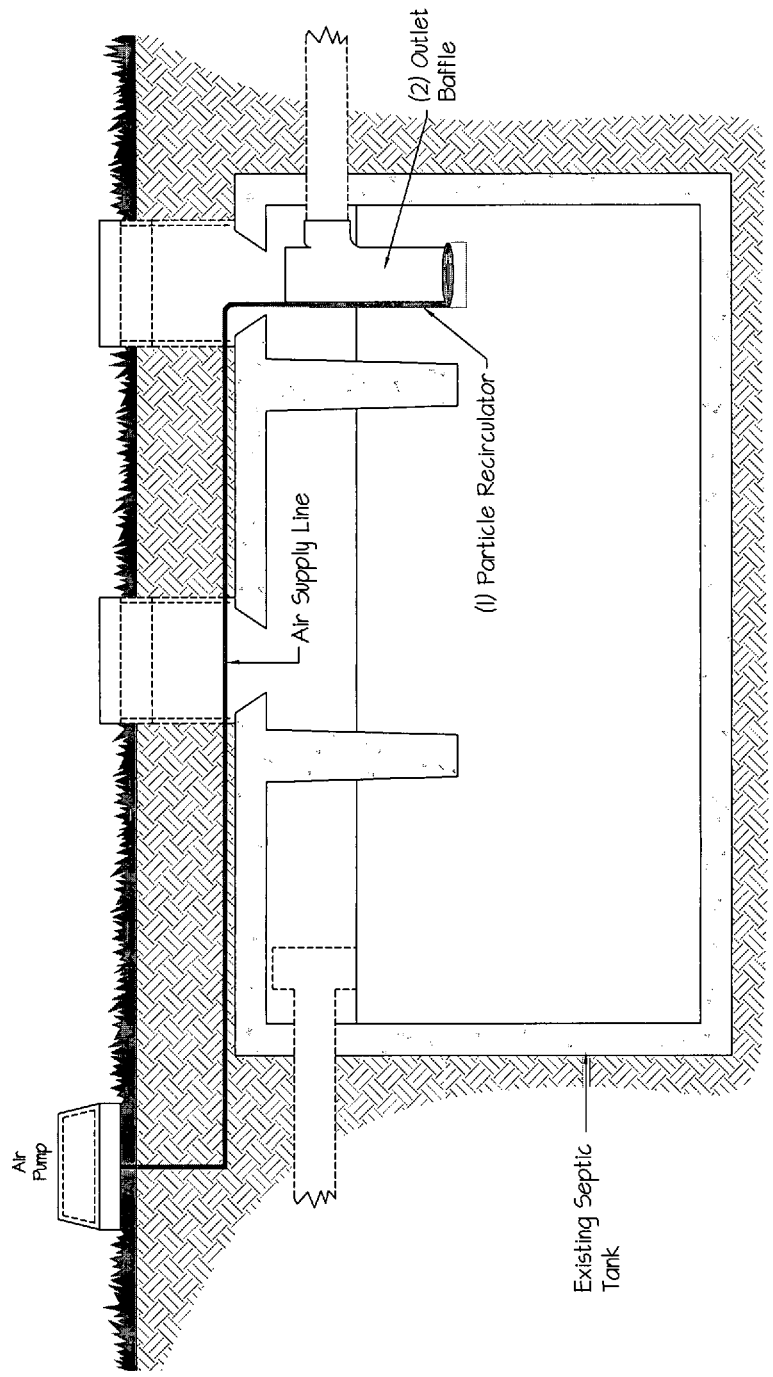
FIG. 1 is a cross-sectional view of an assembled septic system tank containing an outlet baffle, the particle recirculator and an air supply line.

As seen in FIG. 1, the air driven particle recirculator is installed in a typical single compartment septic tank. The particle recirculator (1) is attached on the exterior of the outlet baffle (2) and then connected to an air line which is then connected to an air pump.

Figure 2:
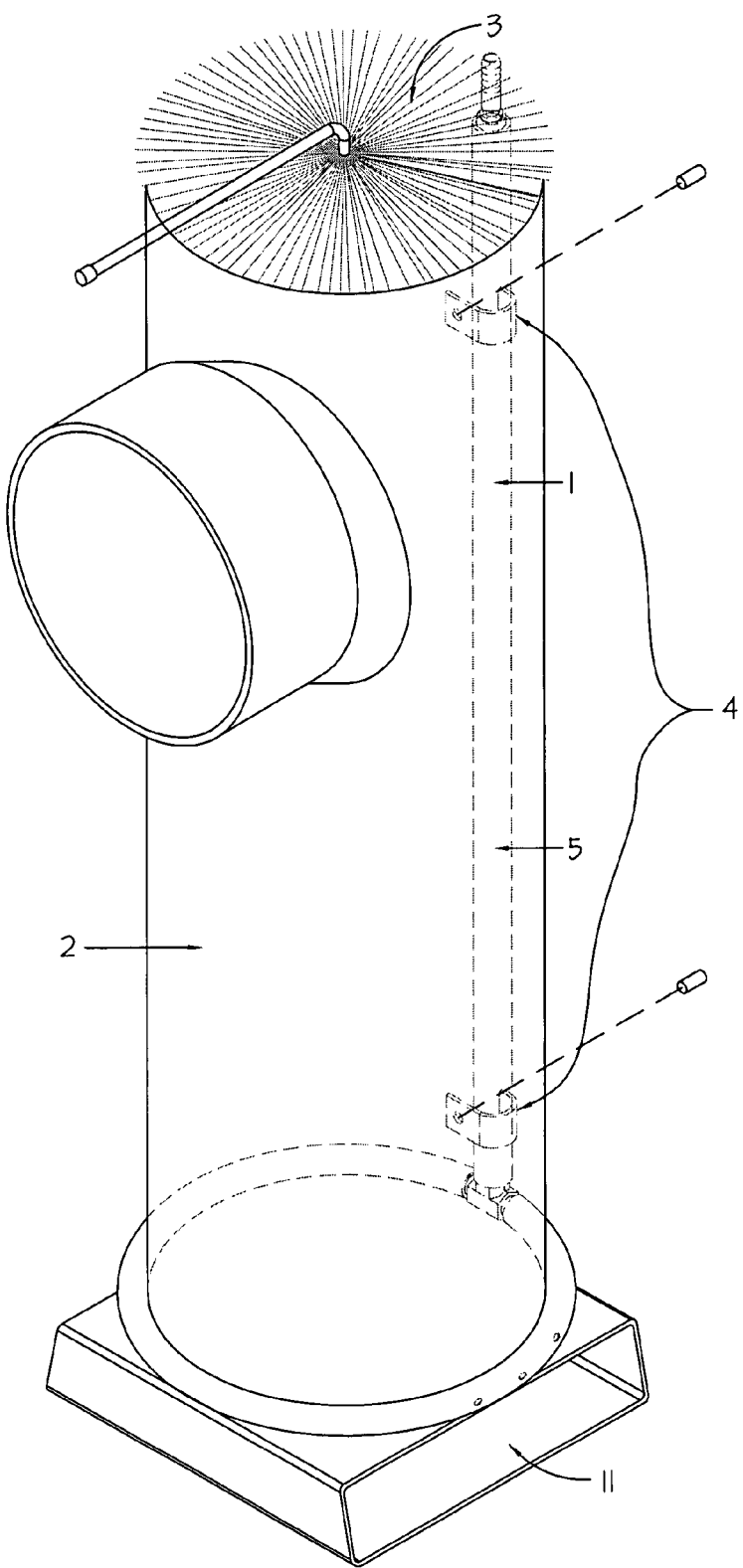
FIG. 2 is an isometric view of the air driven particle recirculator in an embodiment attached to the exterior of a typical outlet baffle with an inlet at two opposite ends of the bottom portion of the outlet baffle, said outlet baffle containing the internal mechanical brush type filter and thus creating the filter assembly.
Figure 3:
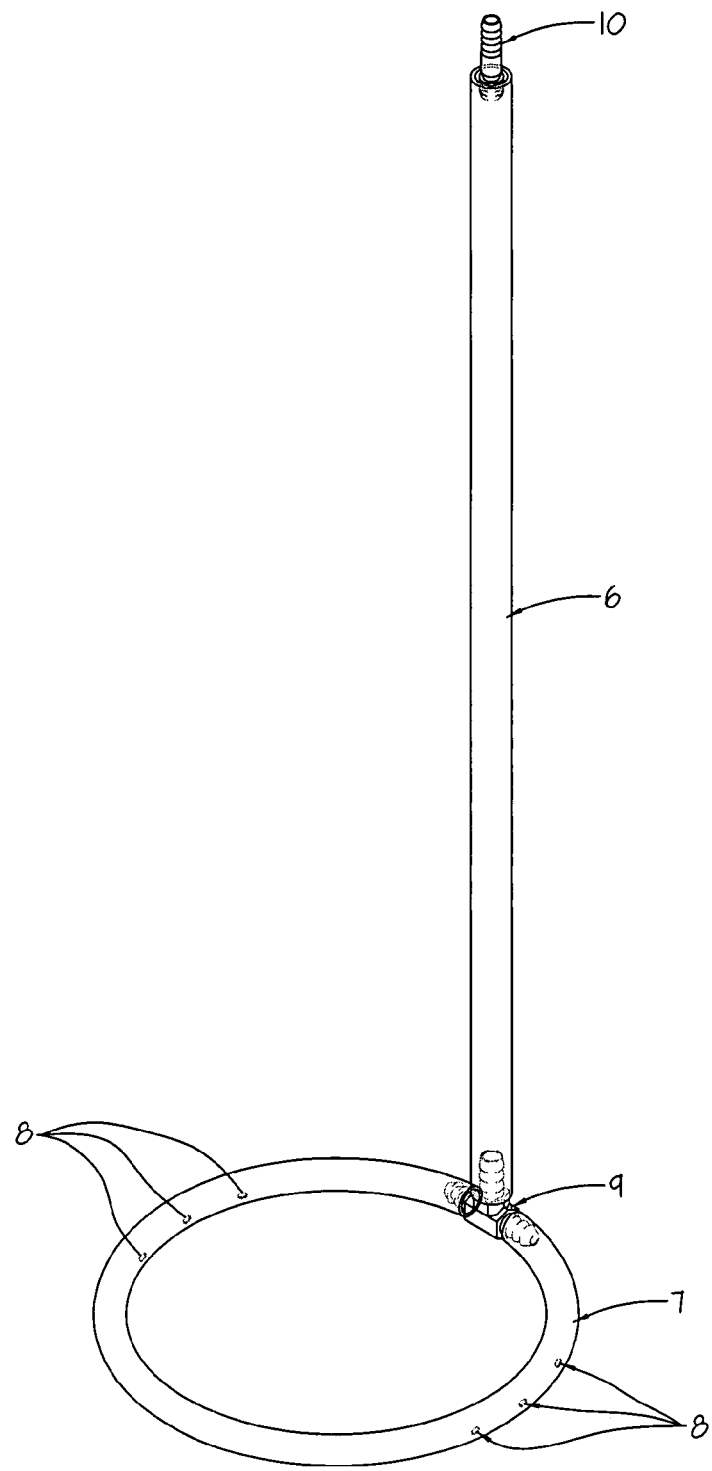
FIG. 3 is an isometric view of the air driven particle recirculator in an embodiment that can be added on to an existing septic system outlet baffle.

FIG. 2 illustrates a close up of the outlet baffle (2), a septic tank filter (3) and the air driven particle recirculator (1). The discharge baffle (2) is comprised of a vertically mounted pvc pipe having a diameter of approximately 7 inches. The septic tank filter (3) is inserted within the outlet baffle (11). There is an opening at the bottom of the discharge baffle which allows effluent from the septic tank to enter at the bottom portion, wherein said effluent will travel through the septic tank filter and then exit the septic tank near the top of the outlet baffle wherein the effluent will discharge in a horizontal direction. The air driven particle recirculator is attached to the outside of the outlet baffle at two connecting points (4), which are shown as mounting clips, which are fastened to the outlet baffle. The vertical portion of the air driven particle recirculator contains a protective outer covering (5) that is positioned externally to the vertically placed second piece of air tubing (6), which is shown in FIG. 3. The protective outer covering (5) protects the second piece of air tubing from the pressure exerted by the connection points (4).

FIG. 3 shows the air driven particle recirculator in one embodiment which can be added to a pre-existing septic system outlet baffle. The first piece of air tubing (7) is curved into a circle and has a diameter of approximately seven inches, just greater than the diameter of the discharge baffle (2) as shown in FIG. 2. FIG. 3 further illustrates the first piece of air tubing (7) contains a series of holes (8) which are evenly spaced throughout the tubing and are approximately 3/32 inch diameter. The first piece of air tubing (7) is connected to the second piece of air tubing (6) by a tee fitting (9) located at the bottom portion of the second piece of air tubing. The tee fitting (9) also acts as a device which forms the circular pattern in the first piece of air tubing (7). The air driven particle recirculator is then attached to an air supply line by a coupling (10) at the upper portion of the second piece of air tubing (6).

Typical outlet baffles (2) have a vertical dimension of approximately twenty inches. The second piece of air tubing (6) as reflected in FIG. 3 has a length of approximately 19.5 inches to meet that approximate length of the outlet baffle (2). Also, the protective outer covering (5) that encases the second piece of air tubing (6) also has a length of 19.5 inches. This length is variable depending upon the size of the outlet baffle used in the septic system.

Figure 4:
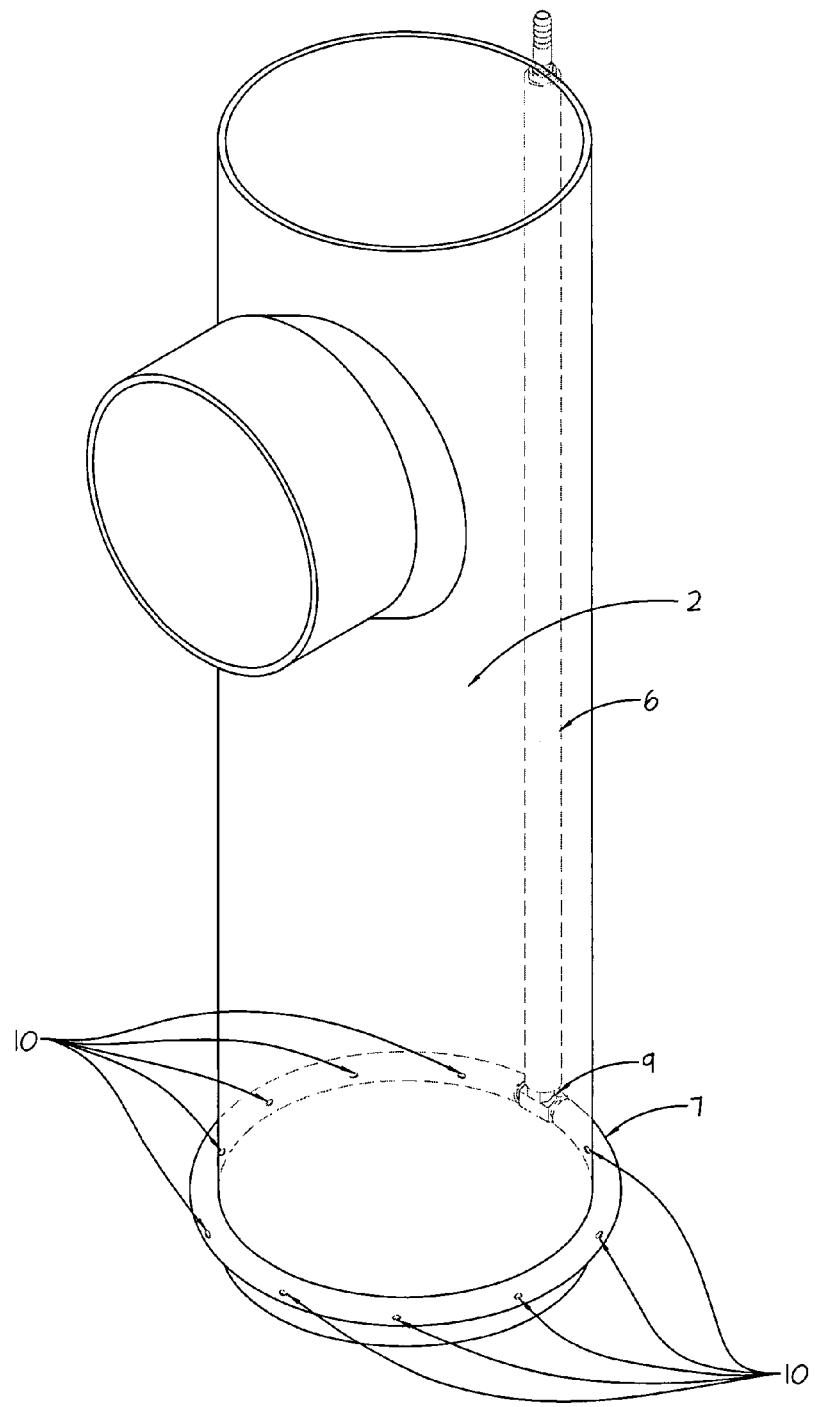
FIG. 4 is an isometric view of the air driven particle recirculator in an embodiment which is attached to an outlet baffle, said outlet baffle having a single circular inlet at the bottom portion of the outlet baffle.

FIG. 4 shows the air driven particle recirculator added to a typical septic system outlet baffle (2) with a single circular inlet at the bottom portion of the outlet baffle (2). In this embodiment, 6 to 12 evenly spaced holes (10) are placed along the first piece of air tubing (7) with the holes (10) having a diameter of approximately 3/32 of an inch. The first piece of air tubing (7) is attached to the second piece of air tubing (6) by the use of a tee fitting (9).

Figure 5:
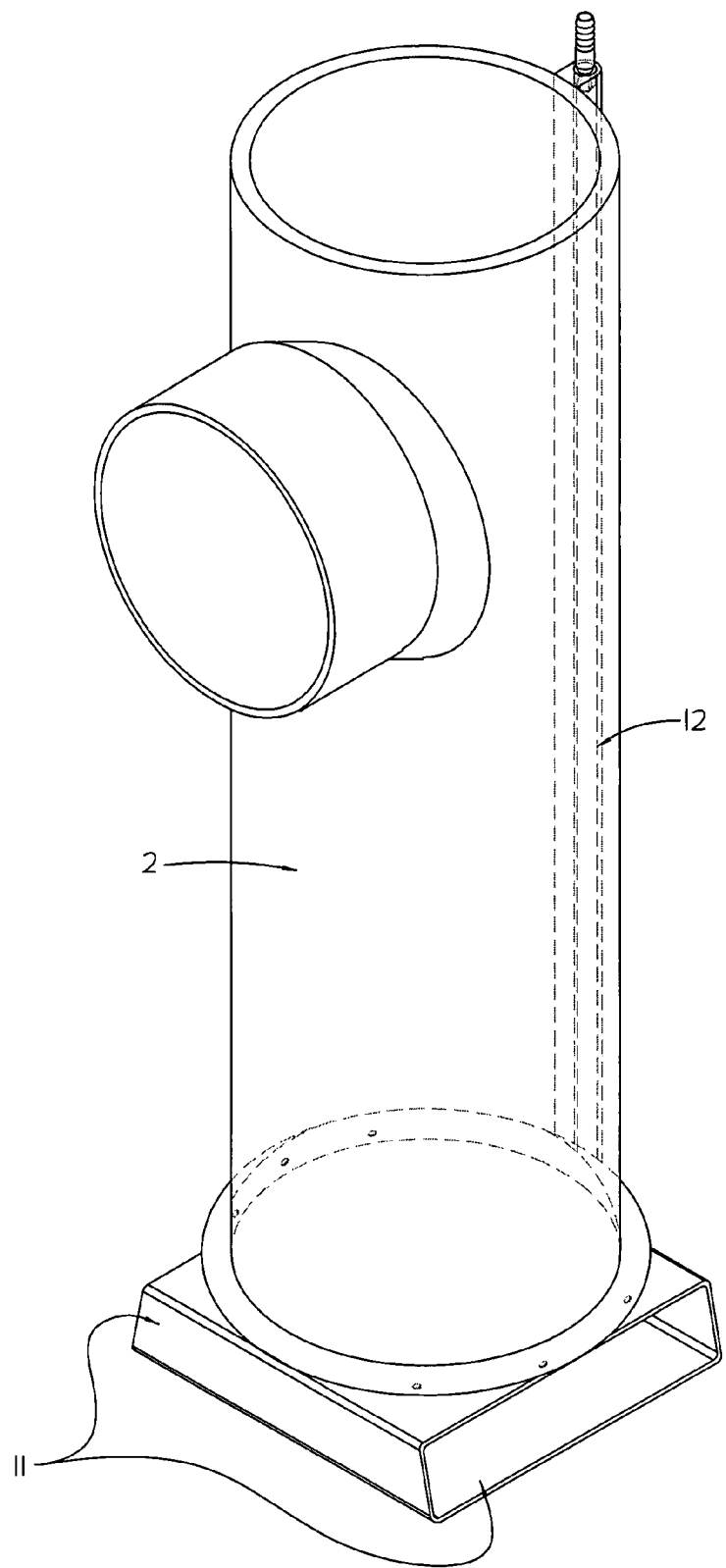
FIG. 5 is an isometric view of the air driven particle recirculator attached to a typical outlet baffle by a single vertically elongated attachment clip, said outlet baffle containing a dual inlet at two opposite ends of the bottom portion of the outlet baffle.

FIG. 5 shows the air driven particle recirculator attached to a typical septic system outlet baffle (2) containing a dual inlet (11) at two opposite ends of the bottom portion of the outlet baffle. The air driven particle recirculator is attached to the outlet baffle by a single vertically elongated attachment clip (12).

Figure 6:
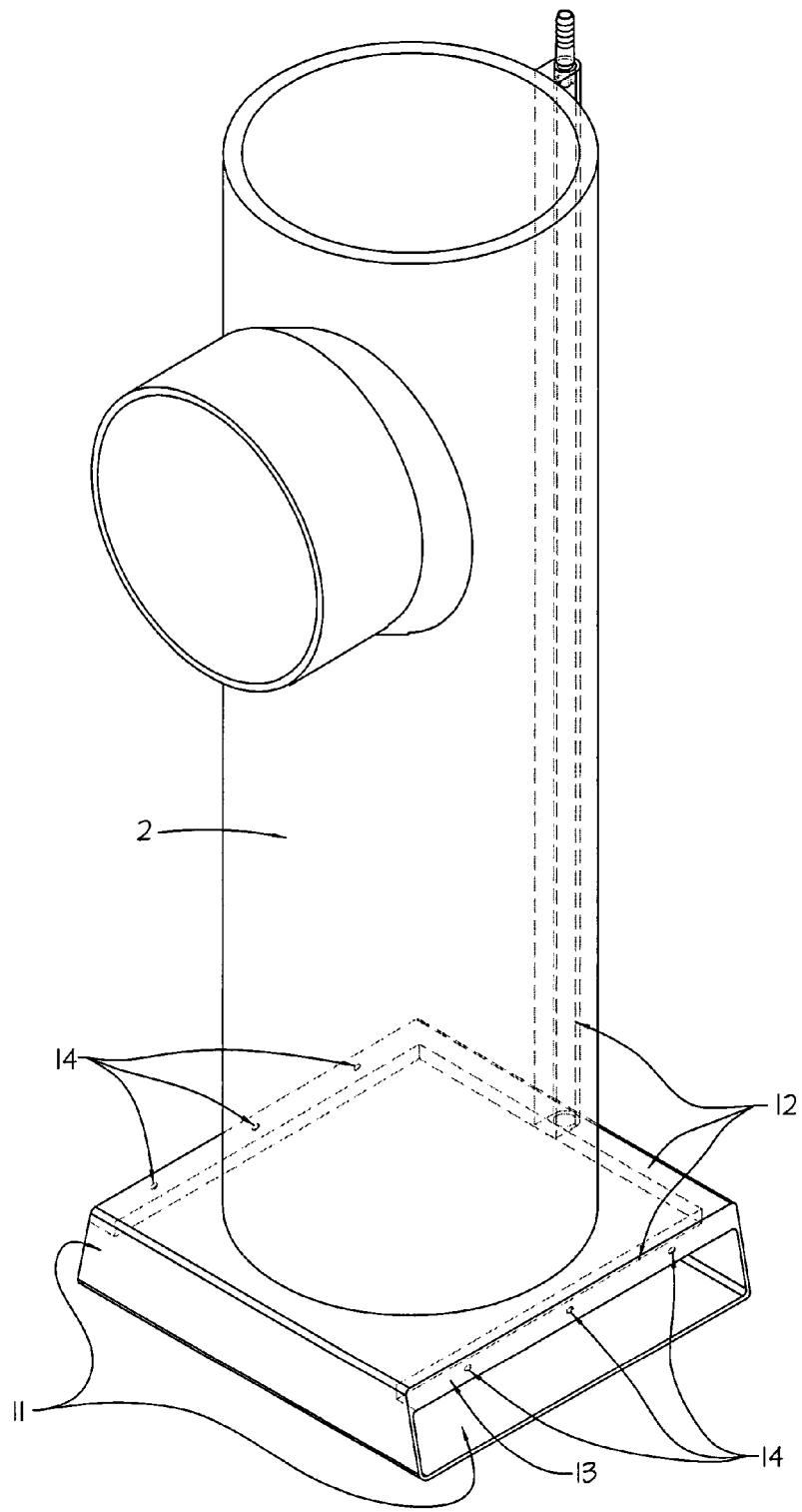
FIG. 6 is an isometric view of the air driven particle recirculator in an embodiment which is incorporated into an outlet baffle by the use of injection molded plastic or other molding methods or materials.

FIG. 6 shows the air driven particle recirculator incorporated into an outlet baffle (2) by the use of injection molding. The means for delivering air (12) to the inlet (11) of the outlet baffle (2) is molded into the exterior vertical portions of the outlet baffle and molded into the lip (13) of the inlet to the outlet baffle. The embodiment in FIG. 6 utilizes 3 holes (14) on each side of the inlet to the outlet baffle, said holes (14) having a diameter of approximately 3/32 of an inch.

I claim:

1. An air driven particle recirculator for use with pre-existing or newly installed single or multiple compartment septic tanks and aerobic systems utilizing an outlet baffle with a bottom inlet, comprising;

Means for delivering forced air around the exterior of the outlet baffle positioned above the bottom inlet to said outlet baffle.

2. The air driven particle recirculator of claim 1, wherein said means for delivering forced air around the exterior of the outlet baffle positioned above the bottom inlet to said outlet baffle is an injected molded air passage along the exterior of the outlet baffle, wherein said injected molded air passage contains evenly spaced holes positioned above the bottom inlet of the outlet baffle.

3. The air driven particle recirculator of claim 1, wherein said means for delivering forced air around the exterior of the outlet baffle positioned above the bottom inlet to said outlet baffle comprises;

a first piece of air tubing containing several holes evenly spaced throughout the tubing positioned in a circular pattern with a horizontal orientation positioned above the bottom inlet to said outlet baffle;

a second piece of air tubing positioned in a vertical orientation;

means for connecting said first piece of flexible air tubing to said second piece of flexible air tubing; and means to connect the upper portion of said second piece of air tubing to an air supply line.

4. The air driven particle recirculator of claim 3, wherein said first piece of air tubing is 1/4 inch tubing curved into a circle having a diameter of approximately 7 inches, with said air tubing containing six 3/32 inch diameter holes evenly spaced throughout the tubing.

5. The air driven particle recirculator of claim 3, wherein said second piece of air tubing is approximately 19 and 1/2 inches tall.

6. The air driven particle recirculator of claim 3, further comprising a protective outer covering positioned externally to said second piece of air tubing.

* * * * *